M. E. PERRING.
LAMP FOR AUTOMOBILES.
APPLICATION FILED SEPT. 28, 1916.
1,235,374.
Patented July 31, 1917.
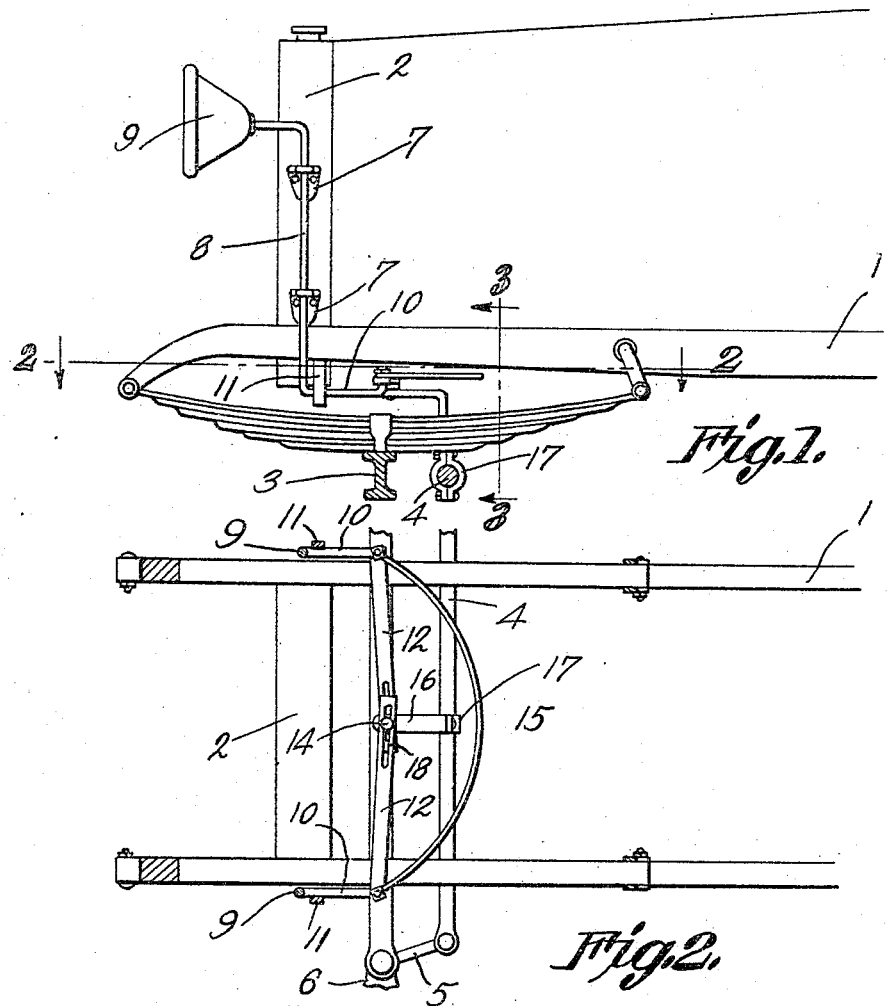
Fig.1.
Fig.2.
Fig.3.
Witnesses
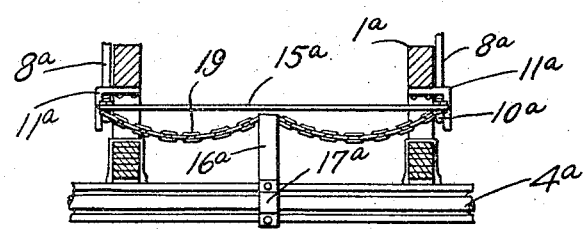
M. E. Perring, Inventor
by C. A. Snow & Co.
Attorneys

UNITED STATES PATENT OFFICE.

MERRICK E. PERRING, OF VOLINIA TOWNSHIP, CASS COUNTY, MICHIGAN.

LAMP FOR AUTOMOBILES.

1,235,374.  Specification of Letters Patent.  Patented July 31, 1917.

Application filed September 28, 1916. Serial No. 122,686.

*To all whom it may concern:*

Be it known that I, MERRICK E. PERRING, a citizen of the United States, residing in Volinia township, in the county of Cass and State of Michigan, have invented a new and useful Lamp for Automobiles, of which the following is a specification.

The device forming the subject matter of this application is adapted to be employed for shifting the lamps on an automobile, so that the lamps will point in the direction in which the vehicle is turning when the vehicle rounds a corner.

The invention aims to provide novel means whereby but one lamp at a time will be actuated, the construction being such that a slight movement in the steering mechanism may take place, without actuating the lamp, thus rendering it possible for the vehicle to alter its course slightly without actuating the lamp, the lamps being turned, one at a time, only when a pronounced movement is given to the steering mechanism, as takes place when the vehicle alters its course materially, to turn a corner or a sharp angle in the road.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—

Figure 1 shows in side elevation, a portion of a motor propelled vehicle equipped with the device forming the subject matter of this application;

Fig. 2 is a horizontal section on the line 2—2 of Fig. 1; and

Fig. 3 is a cross section taken on the line 3—3 of Fig. 1 but showing a slight modification in the invention.

In the drawings the numeral 1 indicates the chassis of a motor propelled vehicle. The radiator is shown at 2, and the numeral 3 designates the front axle. The cross rod appears at 4 and is operatively united as shown at 5 with movable axle ends 6 which carry the forward ground wheels (not shown.) The foregoing elements constitute a part of standard automobiles, and need not be described in great detail, since they are thoroughly understood.

Mounted on some suitable portion of the vehicle frame, for instance on the radiator 2 at the sides thereof are bearings 7 in which are journaled shafts 8 provided at their upper ends with lamps 9. The lamps 9 may be connected with the shafts 8 in any suitable manner. The shafts 8 at their lower ends are equipped with crank arms 10. The crank arms 10 lie inside of stops 11 assembled with the chassis 1 or otherwise supported. The outer ends of the links 12 are pivoted to the rear ends of the crank arms 10. The inner ends of the links 12 are overlapped on each other and are provided with longitudinal slots 18. The ends of the crank arms 10 are connected with an expansion spring 15, preferably of bowed form. The function of this spring 15 is to swing the crank arms 10 outwardly, and to maintain the same yieldingly engaged with the stops 11. An angular, upstanding arm 16 is secured as indicated at 17 to the cross rod 4. The arm 16 carries a projection 14 which moves in the slots 18 of the links 12.

In practical operation, the cross rod 4 may be moved lengthwise, to a slight extent, without actuating the links 12. This procedure is possible, because the projection 14 on the arm 16 can have a limited movement in the slots 18 of the links 12. Since the rod 4 may be moved endwise, to effect a steering of the vehicle, it is possible for the vehicle to deviate slightly from its course, without actuating the lamps 9. Such an operation is useful, for instance, when the vehicle changes its course, slightly, to pass an approaching vehicle, the lamps 9, under such circumstances, pointing straight ahead.

When an extended movement is given to the rod 4, such as takes place when the vehicle rounds a corner, the projection 14 on the arm 16 will arrive at the end of the slot 18 in one of the links 12. This link, together with the corresponding crank arm 10 and the accompanying shaft 8 will be actuated, thus causing one of the lamps 9 to be turned outwardly. If, for instance, the vehicle is turned to the left, around a corner, then the left hand lamp will be turned outwardly, and will point to the left, thus giving the necessary illumination. The expansible spring 15 tends to swing to crank arms 10 outwardly until they engage the stops 11. The lamps 9, therefore, point straight ahead, under ordinary conditions, and until a pronounced movement is given to the steering rod 4.

In Fig. 3 of the drawings, a slight modification of the invention has been shown. In the said figure, the parts hereinbefore described, are designated by numerals already used with the suffix "a." The only modification in this form of the invention consists in replacing the slotted links 12 by a flexible element 19. This flexible element 19 is secured at its outer ends to the crank arms 10ª, and is secured, intermediate its ends, to the arm 16ª, the flexible element 19 hanging loosely on each side of the arm 16ª. It will be seen that, by the construction above described, the operation hereinbefore described may be carried out, without resorting to the links 12.

Having thus described the invention, what is claimed is:—

1. In a device of the class described, a vehicle including movable axle ends; a steering rod operatively connected to the axle ends; lamp shafts journaled on the vehicle and provided with crank arms; stops carried by the vehicle and engaging the outer edges of the crank arms; a bowed spring having its ends connected to the crank arms and constituting means for holding the crank arms yieldingly engaged with the stops; a yieldable connection uniting the crank arms; and means for operatively uniting the yieldable connection with the steering rod.

2. In a device of the class described, a vehicle including movable axle ends; a steering rod operatively connected to the axle ends; lamp shafts journaled on the vehicle and provided with crank arms; stops carried by the vehicle and engaging the outer edges of the crank arms; spring means coacting with the crank arms to hold the same yieldingly engaged with the stops; an arm carried by the steering rod and provided with a projection; and links pivoted at their outer ends to the crank arms, the inner ends of the links being overlapped on each other, and being provided with slots which are elongated transversely of the vehicle, the slots receiving the projection to form a lost motion connection between the links and the steering rod.

In testimony that I claim the foregoing as my own, I have hereto affixed my signature in the presence of two witnesses.

MERRICK E. PERRING.

Witnesses:
 E. O. REIGLE,
 EDWIN SEWARD.

Copies of this patent may be obtained for five cents each, by addressing the "Commissioner of Patents, Washington, D. C."